United States Patent
Jeon et al.

(10) Patent No.: US 8,557,420 B2
(45) Date of Patent: Oct. 15, 2013

(54) SECONDARY BATTERY HAVING TAB WITH BLOWING AGENT AND MANUFACTURING METHOD THEREOF

(75) Inventors: Ji-Hoon Jeon, Daejeon (KR); Seung-Don Choi, Daejeon (KR); Dae-Sik Choi, Gyeonggi-do (KR); Nan-Ji Yun, Daejeon (KR); Yong-Kyu Ju, Daejeon (KR)

(73) Assignee: LG Chem, Ltd., Seoul (KR)

( * ) Notice: Subject to any disclaimer, the term of this patent is extended or adjusted under 35 U.S.C. 154(b) by 133 days.

(21) Appl. No.: 13/030,510

(22) Filed: Feb. 18, 2011

(65) Prior Publication Data

US 2011/0143177 A1    Jun. 16, 2011

Related U.S. Application Data

(63) Continuation of application No. PCT/KR2010/005962, filed on Sep. 2, 2010.

(30) Foreign Application Priority Data

Sep. 28, 2009   (KR) .................. 10-2009-0091847

(51) Int. Cl.
    *H01M 10/50*    (2006.01)
(52) U.S. Cl.
    USPC ............................ 429/62; 429/211

(58) Field of Classification Search
    USPC ................................................ 429/211, 62
    See application file for complete search history.

(56) References Cited

U.S. PATENT DOCUMENTS

| 5,401,595 | A | * | 3/1995 | Kagawa et al. ............... 429/152 |
| 2002/0015892 | A1 | * | 2/2002 | Kitoh ............................ 429/243 |
| 2004/0170887 | A1 | * | 9/2004 | Masumoto et al. ............. 429/61 |
| 2009/0162747 | A1 | * | 6/2009 | Zhu et al. ...................... 429/160 |
| 2009/0197162 | A1 | * | 8/2009 | Shinyashiki et al. ......... 429/161 |

FOREIGN PATENT DOCUMENTS

| JP | 2007-109548 A | 4/2007 |
| KR | 10-2000-0019214 A | 4/2000 |
| KR | 10-2009-0067580 A | 6/2009 |

* cited by examiner

*Primary Examiner* — Zachary Best
(74) *Attorney, Agent, or Firm* — Birch, Stewart, Kolasch & Birch, LLP

(57) ABSTRACT

Provided is a secondary battery, comprising an electrode assembly including a first electrode plate, a second electrode plate and a separator; and a case having a receiving portion for receiving the electrode assembly and an electrolyte therein, the secondary battery comprising: a blowing agent applied onto at least one of a first tab and a second tab in a width direction of the tab, the first and second tabs being, respectively, connected to the first and second electrode plates and connected to leads which extend through the case.

19 Claims, 3 Drawing Sheets

SECONDARY BATTERY HAVING TAB WITH BLOWING AGENT AND MANUFACTURING METHOD THEREOF

CROSS-REFERENCE TO RELATED APPLICATION

This application is a Continuation of PCT International Application No. PCT/KR2010/005962 filed on Sep. 2, 2010, which claims the benefit of Patent Application No. 10-2009-0091847 filed in Korea, on Sep. 28, 2009. The entire contents of all of the above applications are hereby incorporated by reference.

TECHNICAL FIELD

The present invention relates to a secondary battery and a manufacturing method thereof, and in particular, to a secondary battery with an improved structure for preventing explosion or fire resulted from increased inner pressure caused by abnormal conditions, and a manufacturing method thereof.

BACKGROUND ART

Generally, with development of mobile technology and an increase in demand for mobile equipments, the demand for secondary batteries is increasing rapidly. In particular, because lithium (ion/polymer) secondary batteries have high energy density and operating voltage and are advantageous in preservation and life characteristics, they are widely used as energy sources for various types of electronic products as well as for many kinds of mobile equipments.

However, such secondary batteries contain various kinds of combustible materials, and thus, they may be swollen at their cases under abnormal conditions such as over-charge, over-voltage, other physical external impact, or when they are left at high temperature, resulting in heat, fire, explosion and so on. That is, secondary batteries have a disadvantage of poor safety. When secondary batteries operate abnormally, one of solutions is to forcibly discharge an electrolyte in the batteries. As another solution, secondary batteries have safety elements such as positive temperature coefficient (PTC) elements, protection circuit modules (PCMs) and so on, to effectively control the abnormal conditions such as over-charge, over-voltage or the like.

In spite of these safety measures, secondary batteries still have a malfunction problem. If there is something wrong with the safety elements, there is a higher probability of malfunction. Therefore, there is an urgent necessity for improved technology to solve the problem.

DISCLOSURE

Technical Problem

The present invention is designed to solve the problem of the prior art, and therefore, it is an object of the present invention to provide a secondary battery which has an electrode tab provided with a means for shutting off an electric flow to automatically stop charging/discharging in case of a rise in temperature caused by abnormal conditions, thereby improving safety, and a manufacturing method thereof.

Technical Solution

In order to achieve the above object, according to an aspect of the present invention, there is provided a secondary battery, comprising an electrode assembly including a first electrode plate, a second electrode plate and a separator; and a case having a receiving portion for receiving the electrode assembly and an electrolyte therein, the secondary battery comprising: a blowing agent applied on at least one of a first tab and a second tab in a width direction of the tab, the first and second tabs being, respectively, connected to the first and second electrode plates and connected to leads which extend through the case.

Preferably, the secondary battery further comprises a notch formed on at least one side of the tab and extending inwardly a predetermined distance on the same line with the blowing agent. Preferably, the secondary battery further comprises weld portions welded symmetrically with regard to the blowing agent, to suppress the tab from moving when the blowing agent expands.

Preferably, the notch extends inwardly at the opposite sides of the tab.

Preferably, the notch has a shape of V or U.

Preferably, the blowing agent is interposed between the stacked tabs.

Preferably, the blowing agent is a polymer capsule-type physical blowing agent.

Preferably, the weld portion is formed along the entire width of the tab.

In order to achieve the above object, according to another aspect of the present invention, there is provided a method for manufacturing a secondary battery, comprising: applying a blowing agent onto a tab of an electrode plate; forming a notch on at least one side of the blowing agent; arranging a negative electrode plate, a separator and a positive electrode plate in order, and integrating the tabs of the electrode plates such that the notches are aligned with each other; forming an electrode assembly by connecting the ends of the tabs to leads; and receiving the electrode assembly and an electrolyte in a case, and sealing the case tightly.

Preferably, the method further comprises forming at least one weld portion on the tab at a predetermined distance spaced away from the blowing agent, after integrating the tabs.

According to another aspect of the present invention, there is provided a secondary battery manufactured by the above-mentioned method.

Advantageous Effects

The secondary battery and its manufacturing method according to the present invention have the following effects.

First, a blowing agent is applied onto a tab connected to an electrode of a secondary battery such that the blowing agent does not affect the secondary battery within a normal usage temperature range while it foams at high temperature, whereby the blowing agent cuts off the tab in case of rising temperature in the secondary battery caused by abnormal conditions, thereby shutting off an electric flow through the secondary battery, ensuring stability of the battery.

Second, a notch is formed close to the blowing agent, so that the tab can be cut off at an accurate location.

Third, a weld portion is located about the blowing agent, so that an area influenced by the effect of the blowing agent is limited to an area around the weld portion, resulting in effect maximization.

DESCRIPTION OF DRAWINGS

Other objects and aspects of the present invention will become apparent from the following description of embodiments with reference to the accompanying drawing in which.

BEST MODE

Hereinafter, a secondary battery and a manufacturing method thereof according to preferred embodiments of the present invention will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Generally, secondary batteries may be classified into lithium ion batteries, lithium ion polymer batteries, and lithium polymer batteries, according to the type of separator and electrolyte used. Secondary batteries may be divided into cylindrical batteries, coin-type batteries and pouch-type batteries according to the shape. And, secondary batteries may be sorted into bulk batteries and thin film batteries according to the size. A secondary battery 100 according to a preferred embodiment of the present invention is suitable as, particularly, a so-called pouch-type battery comprising a positive electrode plate and a negative electrode plate stacked alternately, and a separator of polyethylene interposed therebetween. Thus, the secondary battery 100 to be described below is a pouch-type lithium secondary battery, and as its structure and manufacturing method thereof is well known in the art, a detailed description thereof is omitted herein.

Figure 1:
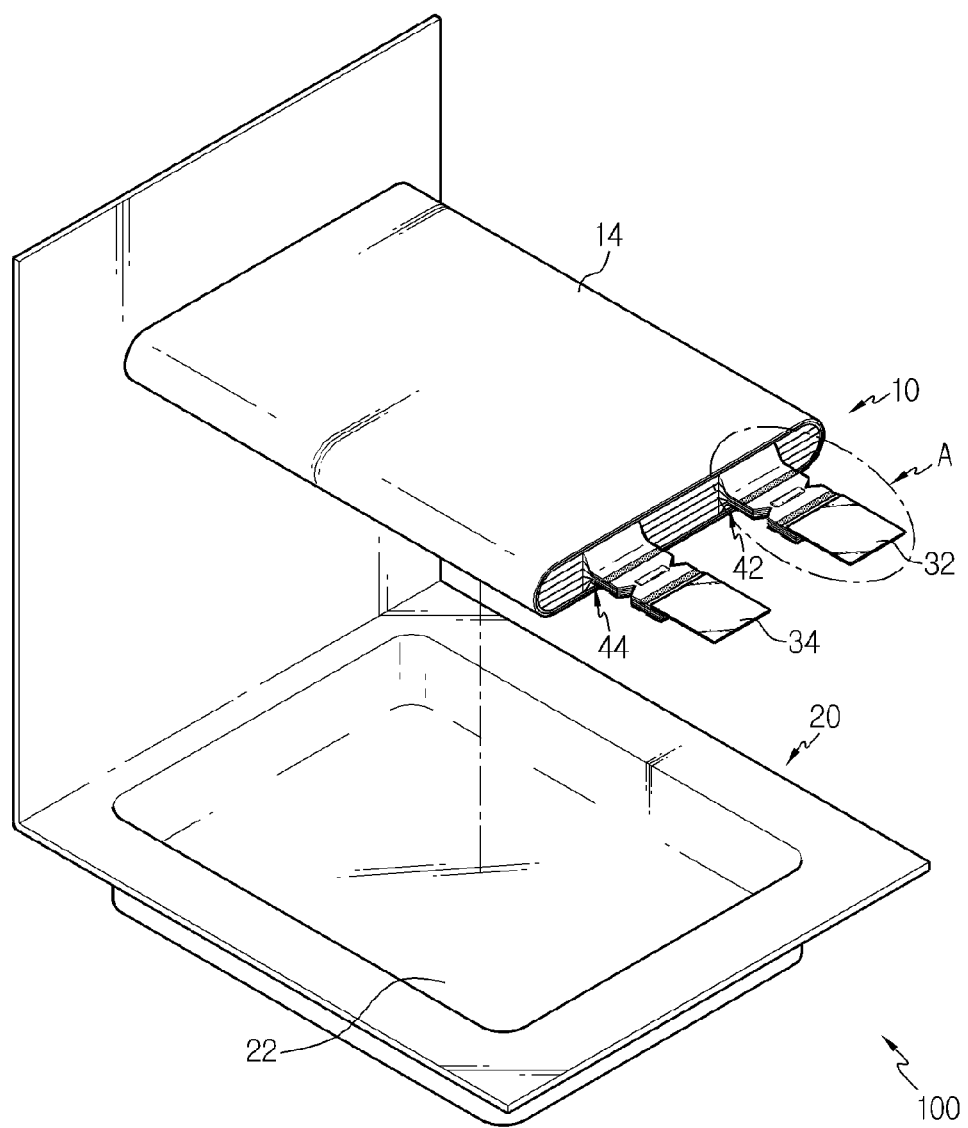
FIG. 1 is a schematic perspective view of a secondary battery according to a preferred embodiment of the present invention.
Figure 2:
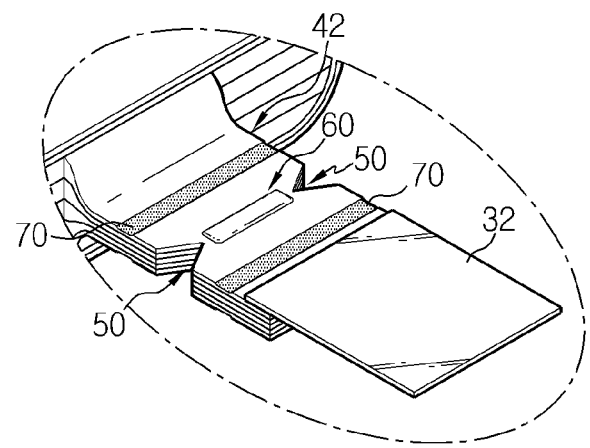
FIG. 2 is an enlarged view of section A of FIG. 1.
Figure 3:
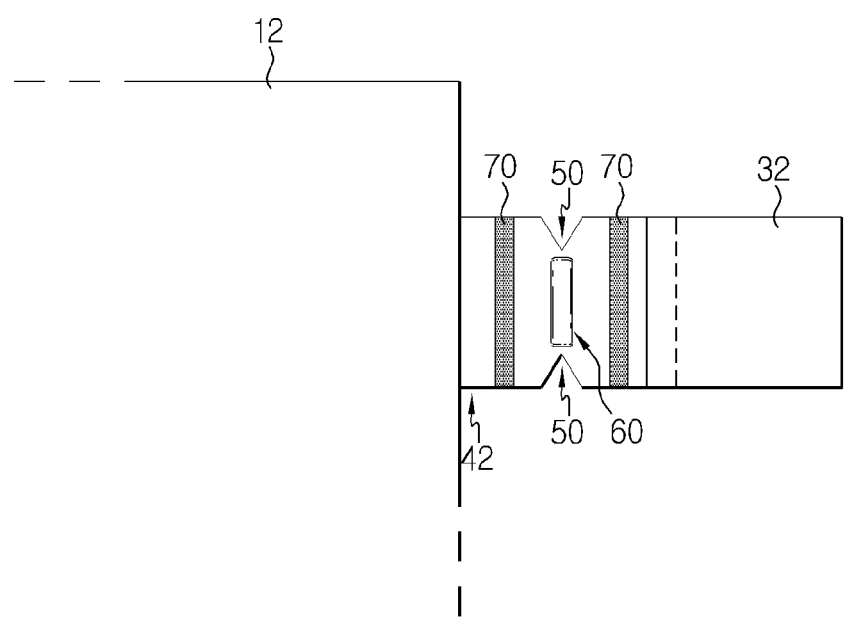
FIG. 3 is a plane view of tabs in FIG. 1.
Figure 4:
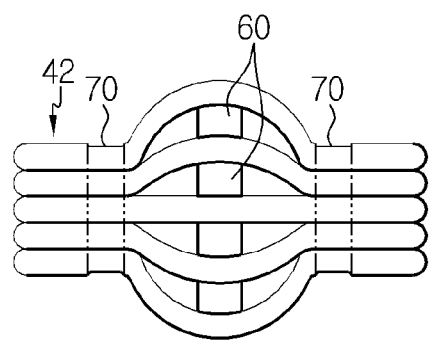
FIG. 4 is an enlarged cross-sectional view of the tabs in FIG. 1.

Referring to FIGS. 1 through 4, the secondary battery 100 according to a preferred embodiment of the present invention comprises an electrode assembly 10 including a first electrode plate 12 (See FIG. 3), a second electrode plate (not shown), and a separator 14; and a case 20 having a receiving portion 22 for receiving the electrode assembly 10 and an electrolyte therein.

According to the preferred embodiments of the present invention, the secondary battery 100 has first tabs 42 and second tabs 44 formed integrally with the first electrode plates 12 and the second electrode plates, respectively. The first tabs 42 and the second tabs 44 have a first lead 32 and a second lead 34 connected thereto by welding, respectively, and each lead 32 and 34 extends through the case 20. The first and second tabs 42 and 44 each has a notch 50 formed on at least one side thereof. The notch 50 extends inwardly a predetermined distance in a width direction of each tab 42 and 44. A blowing agent 60 is applied onto the tabs 42 and 44, and extends in a width direction of each tab 42 and 44 on a substantially same line with the notch 50. A weld portion 70 is disposed around the blowing agent 60 of each tab 42 and 44. The weld portion 70 can suppress the corresponding tabs 42 and 44 from moving when the blowing agent 60 expands.

The electrode assembly 10 is a so-called pouch-type battery in which electrode plates are stacked, for example, the first electrode plate 12, the separator 14, and the second electrode plate are arranged in order. Here, the first electrode plate 12 is a cathode, and the second electrode plate is an anode. In the electrode assembly 10, the first electrode plate 12 and the second electrode plate are typically formed by applying an active material on at least one surface of a current collector. And, a cathode current collector is made from aluminum (Al), and an anode current collector is made from copper (Cu). Preferably, the cathode current collector or the anode current collector has a thickness between 3 and 500 μm.

The first and second leads 32 and 34 are terminals of the secondary battery that are connected to any external equipment (not shown), and they are made from a conventional conductive material known in the art. As mentioned above, the first and second leads 32 and 34 are connected to the ends of the first and second tabs 42 and 44 by welding, respectively.

The first and second tabs 42 and 44 are made from the same material as that of the first electrode plate 12 and the second electrode plate, but their surfaces are not coated with an active material. The secondary battery 100 with a stack of a plurality of electrode plates has the same number of tabs as the electrode plates, wherein the tabs have the same polarity and are integrated at substantially the same location and connected to the corresponding leads 32 and 34, respectively.

The first and second tabs 42 and 44 each has the notch 50 formed on at least one side thereof, which extends inwardly a predetermined distance in a width direction of each tab 42 and 44. Although this embodiment shows the notches 50 formed at both sides of each tab 42 and 44, the notch 50 may be formed at any one side of each tab 42 and 44. And, although this embodiment shows the notches 50 formed at both the first tab 42 and the second tab 44, the notches 50 may be formed at any one of the first tab 42 and the second tab 44. The notches 50 are designed to induce cracking in a width direction of the tabs 42 and 44 when necessary. That is, when the tabs 42 and 44 are integrated at the same location and the notches 50 are disposed at the same location accordingly, cracking and splitting may occur to the tabs 42 and 44 at the same location. The notches 50 may be in the shape of V or U, or any other known shapes.

The blowing agent 60 is applied onto the first and second tabs 42 and 44 in a width direction of the tabs 42 and 44 on substantially the same line with the notch 50. Preferably, the blowing agent 60 may be interposed between the stacked tabs 42 and 44. The blowing agent 60 is designed to cut off a portion of the tabs 42 and 44 by foaming, in case of abnormal conditions of the secondary battery 100, such as rising inner pressure while using.

The blowing agent 60 may be, for example, a physical blowing agent which contains low boiling point hydrocarbon therein and is encapsulated by a polymer shell composed of copolymer. The blowing agent 60 starts to foam at temperature between 80 and 100° C. approximately. A maximum foaming temperature is between 130 and 150° C. approximately, and an average particle size is between 10 and 50 micrometers approximately. It is obvious to an ordinary person skilled in the art that the blowing agent 60 may use any material formable in the above-mentioned temperature range, now known or later developed. It is also obvious to an ordinary person skilled in the art that the blowing agent 60 may be replaced by any material blowable and/or expandable in a predetermined temperature range.

The weld portion 70 is configured to suppress the tabs 42 and 44 from moving in a plane direction when the blowing agent 60 expands, and is formed substantially close to the blowing agent 60. The weld portion 70 is designed to, for example, cut off the foil-type tabs 42 and 44 more easily. And, the weld portion 70 is formed along the entire width of the tabs 42 and 44, thereby suppressing the movement of the tabs 42 and 44 more effectively.

Hereinafter, a method for manufacturing a secondary battery according to a preferred embodiment of the present invention is described.

First, the blowing agent 60 is applied onto the tab 42 and 44 of an individual electrode plate (a positive electrode plate and/or a negative electrode plate) in a width direction of the tab 42 and 44.

Next, the notches 50 are formed at the opposite sides of the tab 42 and 44 such that the ends of the applied blowing agent 60 are substantially contacted with the front ends of the notches 50. It is preferred to use a punching machine at this process.

Subsequently, a negative electrode plate, a separator and a positive electrode plate are arranged in order, and the tabs 42 and 44 of the electrode plates are integrated such that the notches 50 are aligned with each other.

Next, the weld portion 70 is formed symmetrically with regard to the blowing agent 60 on the integrated tabs 42 and 44 at a predetermined distance spaced away from the blowing agent 60. The weld portion 70 may be formed by any other methods known in the art, such as spot welding, ultrasonic welding and so on.

Subsequently, the ends of the tabs 42 and 44 are connected to leads, to form the electrode assembly 10.

Finally, the electrode assembly 10 is received in the case 20 together with an electrolyte, and the case 20 is sealed tightly.

Hereinabove, the present invention is described with reference to the limited embodiments and drawings. However, the description proposed herein is just a preferable example for the purpose of illustrations only, not intended to limit the scope of the invention, so it should be understood that other equivalents and modifications could be made thereto without departing from the spirit and scope of the invention.

What is claimed is:

1. A secondary battery, comprising:
    an electrode assembly including a first electrode plate having a first tab made from the same material as the first electrode plate;
    a first active material coated on a surface of the first electrode plate but not the first tab;
    a second electrode plate having a second tab made from the same material as the second electrode plate;
    a second active material coated on a surface of the second electrode plate but not on the second tab;
    a separator;
    a case having a receiving portion for receiving the electrode assembly and an electrolyte therein;
    a first lead having a first end connected to the first tab and a second end extending through the case;
    a second lead having a first end connected to the second tab and a second end extending through the case; and
    a blowing agent applied on at least one of the first tab and the second tab which are located within the receiving portion, the blowing agent expanding at a predetermined temperature.

2. The secondary battery of claim 1, further comprising:
    a notch on at least one side of the first and second tabs and extending inwardly a predetermined distance on a same line with the blowing agent.

3. The secondary battery of claim 1, further comprising:
    a weld portion welded symmetrically with regard to the blowing agent, to suppress the first and second tabs from moving when the blowing agent expands.

4. The secondary battery of claim 2,
    wherein the notch extends inwardly at opposite sides of the first and second tabs.

5. The secondary battery of claim 2, wherein the notch has a shape of V or U.

6. The secondary battery of claim 1, further comprising:
    a plurality of first tabs; and
    a plurality of second tabs,
    wherein the first tabs are stacked and the second tabs are stacked, and
    wherein the blowing agent is interposed between the stacked tabs.

7. The secondary battery of claim 1, wherein the blowing agent is a polymer capsule-type physical blowing agent.

8. The secondary battery of claim 3, wherein the weld portion is formed along the entire width of the tab.

9. A method for manufacturing a secondary battery, comprising:
    applying a first blowing agent onto each first tab of a plurality of first electrode plates;
    applying a second blowing agent onto each second tab of a plurality of second electrode plates;
    forming a first notch on at least one side of each first tab;
    forming a second notch on at least one side of each second tab;
    arranging the first electrode plates, a separator and the second electrode plates in order, and integrating the first and second tabs such that the first and second notches are aligned with each other, respectively;
    forming an electrode assembly by connecting ends of the first tabs to a first lead and ends of the second tabs to a second lead;
    receiving the electrode assembly and an electrolyte in a case, such that a portion of the first and second blowing agents are received within the case and the first and second leads protrude through the case; and
    sealing the case tightly,
    wherein the first and second blowing agents expand at a predetermined temperature.

10. The method of claim 9, further comprising:
    forming first and second welding portions on the first and second tabs at a predetermined distance spaced away from the first and second blowing agents, respectively, after integrating the tabs.

11. The secondary battery of claim 2, further comprising:
    a plurality of first tabs; and
    a plurality of second tabs,
    wherein the first tabs are stacked and the second tabs are stacked, and
    wherein the blowing agent is interposed between the stacked tabs.

12. The secondary battery of claim 2, wherein the blowing agent is a polymer capsule-type physical blowing agent.

13. The secondary battery of claim 2, wherein the notch extends inwardly at opposite sides of the first and second tabs.

14. The secondary battery of claim 1, wherein the predetermined temperature is in a range between 80° to 100° C.

15. The secondary battery of claim 1, wherein the predetermined temperature is in a range between 130° to 150° C.

16. The method of claim 9, wherein the predetermined temperature is in a range between 80° to 100° C.

17. The method of claim 9, wherein the predetermined temperature is in a range between 130° to 150° C.

18. The secondary battery of claim 1, wherein the first tab and the second tab are within the case.

19. The method of claim 9, further comprising arranging the first tab and the second tab within the case, wherein the blowing agent is applied to the first tab and the second tab.

* * * * *